April 23, 1935.  S. BRAMLEY-MOORE  1,998,703
JACKING APPARATUS
Filed Nov. 9, 1933  2 Sheets-Sheet 1
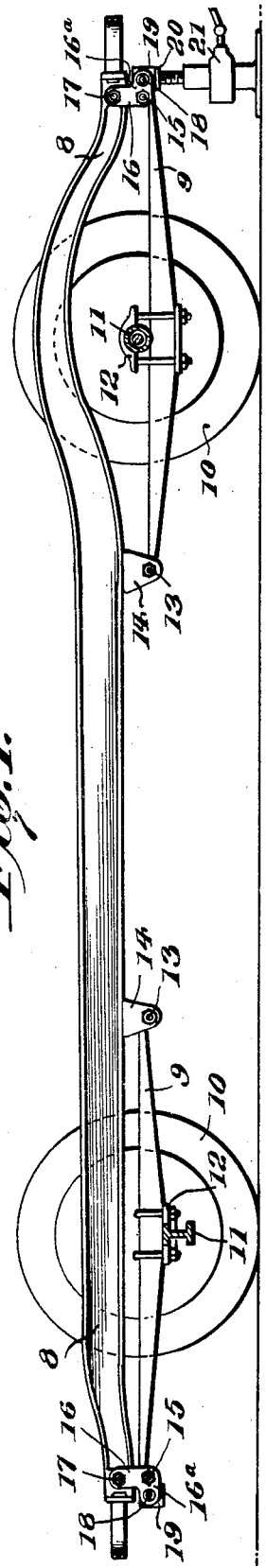
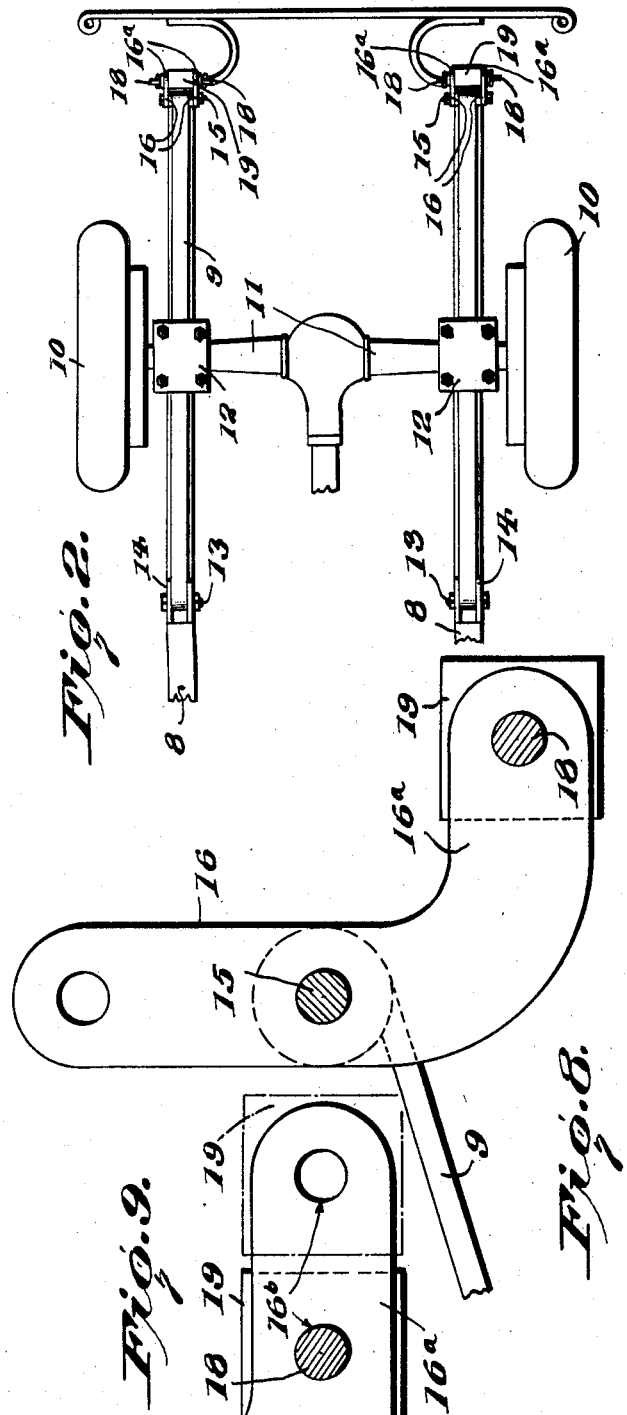
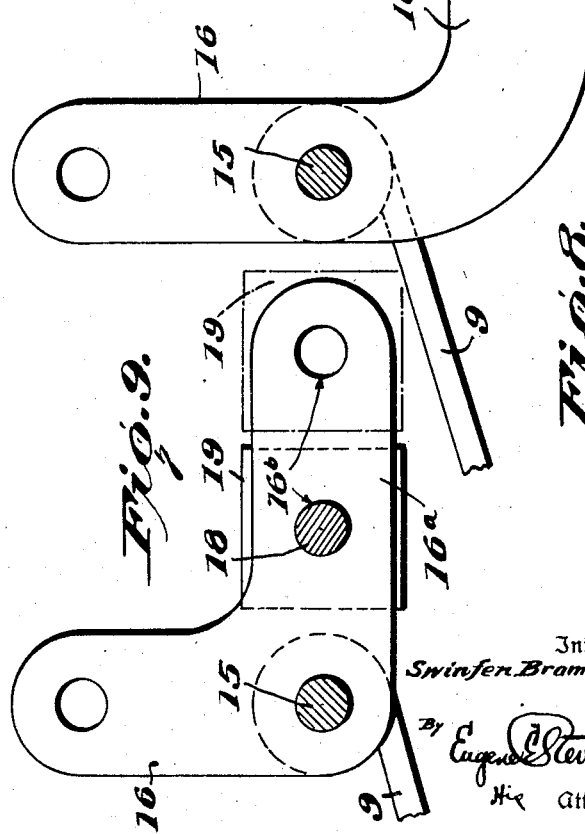
Inventor
Swinfen Bramley-Moore
By Eugene Stevens
His Attorney

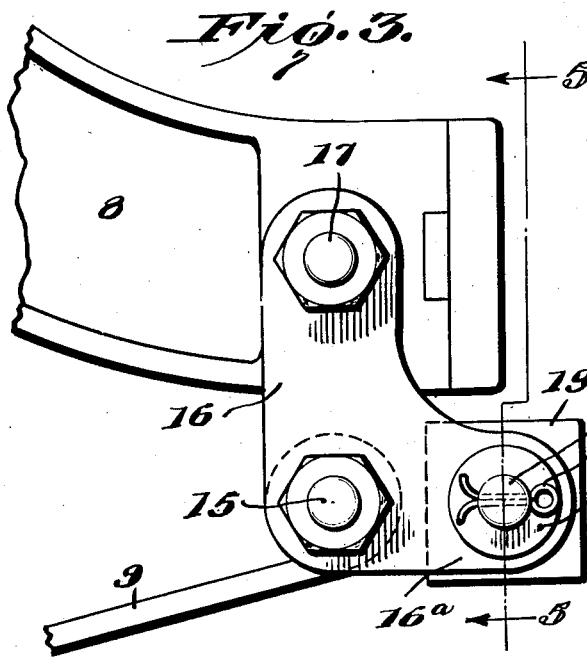
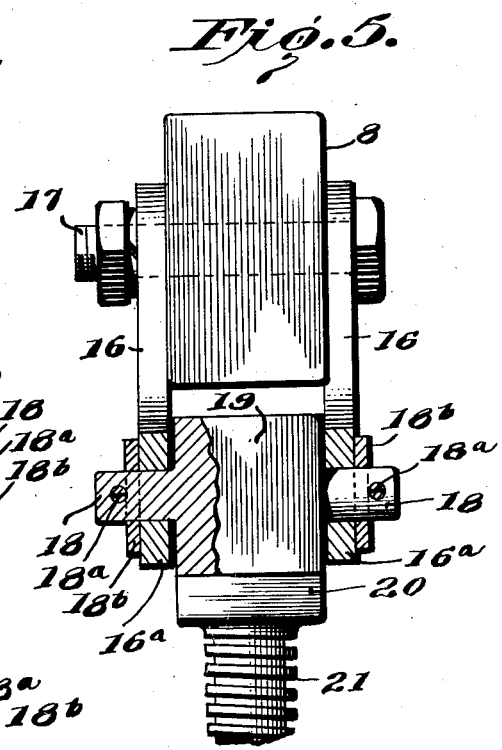
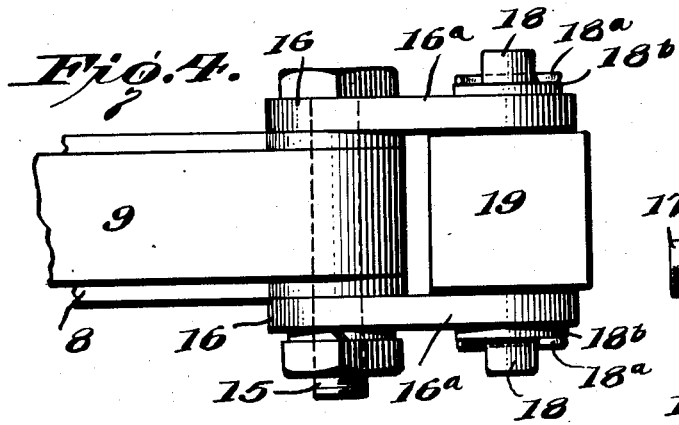
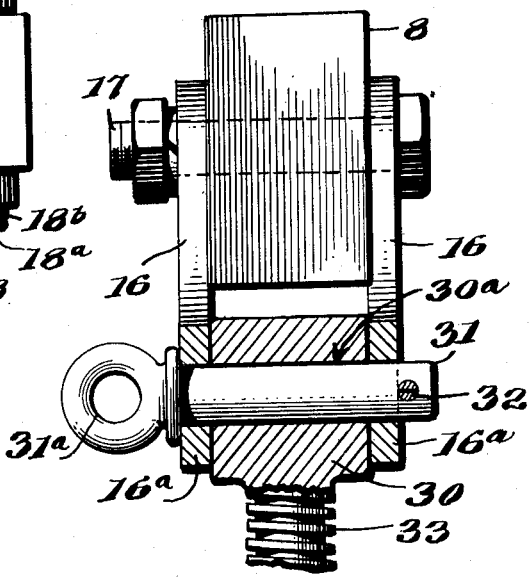

Patented Apr. 23, 1935

1,998,703

UNITED STATES PATENT OFFICE 1,998,703

JACKING APPARATUS

Swinfen Bramley-Moore, White Plains, N. Y., assignor to General Motors Corporation, Detroit, Mich., a corporation of Delaware Application November 9, 1933, Serial No. 697,343

10 Claims. (Cl. 267—54)

My invention relates to improvements in vehicle jacking and has for its primary object the provision of a novel vehicle carried means for preventing relative sagging movement of the spring carried axle and wheel with respect to the chassis when the car is jacked up.

More specifically, it is an object of the invention to provide a novel shackle link connection between one end of the conventional elliptical axle-carrying leaf spring or the like, and the chassis frame,—the nature of the shackle link construction being such as to provide a lateral or off-set jack carrying or seating extension whereby, when a jack is applied to such extension and operated, the spring will not sag but will, along with its axle and wheel, move upwardly as a unitary part of the chassis.

The invention also resides in certain novel features of construction, combination and arrangement of the various parts and in modes of operation,—all of which will be readily understood and appreciated by those skilled in the art upon reference to the accompanying drawings in connection with the detailed description to follow.

It is to be understood that the invention may be applicable to other than wheeled vehicles, and that the word vehicle is used in a broad generic sense.

The accompanying drawings illustrate what now appears to be a preferred example of the invention.

In the drawings, Figure 1 is a longitudinal sectional view through a vehicle chassis frame and illustrating the application of the invention to the leaf springs at the front and rear of the frame;

Figure 2 is a bottom plan view of the construction shown in Figure 1;

Figure 3 is an enlarged detail view and side elevation showing the rear end of the chassis frame and the rear end of one leaf spring with my novel shackle link associated therewith;

Figure 4 is a bottom plan view of the structure shown in Figure 3;

Figure 5 is a sectional view taken on the line 5—5 of Figure 3 and illustrating the jack engaging block which is carried between opposed lateral extensions of companion shackle links;

Figure 6 is a fragmentary side elevational view illustrating a modified form of the invention wherein a jack element is adapted to be removably secured to the shackle link extension;

Figure 7 is an enlarged rear elevation, partly in section, of the form shown in Figure 6, and Figures 8 and 9 are side elevations of modified forms of the links.

Referring specifically to the drawings, and having reference to Figures 1-5, inclusive, numeral 8 designates a channel side member of a conventional motor vehicle chassis, non-essential details of the chassis having been eliminated for the sake of clarity.

Numeral 9 designates the conventional leaf spring which carries the axle 11 and wheels 10, 10 there being illustrated a conventional clamp 12 for securing the axle 11 to the spring 9.

The inner end of the spring 9 (whether it be a front spring or rear spring) is pivoted as at 13 to a bracket or the like 14 secured to the side channel 8 as usual.

The outer end of spring 9 is pivoted as at 15 between the lower ends of two novel shackle links 16 of which one is disposed at one side of channel 8 and the other adjacent the other side. The upper ends of shackle links 16 are pivoted to the chassis frame member 8 as indicated at 17.

As clearly shown in the drawings, the novel shackle links 16 are of angular or bell crank form so as to provide rearwardly extending arms 16a.

Between the rearwardly extending arms 16a of the novel shackle links 16, I provide a jack engaging member which may take the form of a block 19 (see Figure 5) having pintles 18 extending through holes in the opposed arm 16a of shackle links 16. Cotter pins and washers 18a, 18b respectively, may be employed for holding the parts assembled as indicated in Figure 5.

Figures 1 and 5 illustrate the application of the head 20 of a conventional jack 21 to the block 19 for effective simultaneous elevation of the wheel and chassis as a unit.

The operation of the device will be apparent from an inspection of Figures 1 and 3. The lifting force of the jack 20 is applied rearwardly of the pivot connection 15 that joins the spring 9 with shackle links 16. Thus the force of the jack tends to rock shackle links 16 about 17 as an axis and this counteracts the weight of the spring axle and wheel so that instead of the latter sagging as would be the case if the jack head 20 were applied directly to chassis member 8, the chassis, wheel, axle and spring at the particular corner of the car to which the jack is applied all go up together as a unit.

Figures 6 and 7 illustrate a slightly modified form of the invention which differs from that disclosed in Figures 1-5, inclusive, only in that positive means is availed of for securing the jack directly to the rearwardly extending arms 16a of shackle links 16. In other words, block or member 19 of Figures 1–5 inclusive, is eliminated. A special jack 33 is employed in Figures 6 and 7 having a head 30 provided with a transverse bore 30a which is adapted to be alined with the opposed holes in the outer ends of arms 16a for the insertion of a pin 31. Pin 31 has the eye 31a and a cotter pin 32 may be inserted through the opposite end of pin 31 to hold it in place while the jacking operation is going on.

From the foregoing description taken in connection with the accompanying drawings it will be evident that my novel shackle link will function just the same as the conventional shackle link to permit the normal flexing movement of springs 9 when the vehicle is in transit. The rear extensions 16a of shackle links 16 are inconspicuous and in no way detract from the appearance of the car. Yet, at the same time, it furnishes a high efficient means for effective simultaneous lifting of the axle end, wheel and chassis.

The form of link depicted in Figure 8 is found to be very convenient for attachment to automobiles now in use on which the shackle arrangement is somewhat higher than the axle. This form of link allows the shackle arms to extend further vertically downwards before being angled horizontally and this arrangement will bring the rearward extension portion 16a nearer to the ground and thus permits the usual short form of jack to be used. The pivot 15 of the spring 9 is somewhat higher than the pintles 18 of the block 19.

Figure 9 illustrates a form of link in which the extension portion 16a may be provided with a number of pivot openings 16b for the reception of the pintles 18, carried by the block 19, thus providing alternative leverages.

Having thus described my invention, what I claim as new is:

1. A jacking attachment for vehicles comprising a spring and chassis connecting means comprising duplicate shackle links, one at one side of the spring and the other at the other side and said shackle links having offset rearwardly extending arms, and a jack-head seating member carried adjacent the outer ends of said offset rearwardly extending arms.

2. The jacking attachment for vehicles comprising a spring and chassis connecting means comprising duplicate bell crank links, one at one side of the spring and the other at the other side, one arm of each of said links being pivoted to the chassis, a jack engaging portion carried by the other arms of said links, and a pivotal connection between the apices of said bell crank links and the vehicle spring.

3. In a motor vehicle or the like having a chassis frame member at one side and a subjacent wheel carrying leaf spring, a bell crank shackle link disposed adjacent an end of the vehicle and having one arm pivoted to said chassis frame member, a pivot connection between said spring and bell crank at approximately the apex of the link, and the other arm of said bell crank extending outwardly of said spring toward said vehicle end for engagement by a jack.

4. A jacking attachment for vehicle comprising an angular lever, one end of said lever being pivoted to the chassis, an intermediate portion pivotally carrying an axle supporting spring and means for detachably securing a jack to the other end of said lever.

5. A jacking attachment for vehicles comprising a spring and chassis connecting shackle link and said link having an offset jack engaging portion provided with an adjustable member for receiving the head of a jack.

6. In a jacking device for application to a wheeled vehicle having a chassis frame and a spring, a pair of plates pivoted at one end to the chassis frame and intermediate their ends to the spring to form a spring shackle, the other ends of said plates projecting away from the spring, and a spacer positioned between the last-named ends and adapted to receive a jacking device to raise the vehicle.

7. In a jacking device for application to a wheeled vehicle having a chassis frame and a spring, a pair of angle plates pivoted at one end to the chassis frame and to the spring at the angle to form a spring shackle, the other ends of said plates projecting away from the spring and in the longitudinal direction thereof, and a spacer positioned between the last-named ends and adapted to receive a jacking device to raise the vehicle.

8. In a jacking device for application to a wheeled vehicle having a chassis frame and a spring, a pair of angular plates pivoted at one end to the chassis frame and at a point to one side of the angle end to the spring to form a spring shackle, the other ends of the plates projecting away from the spring and means for receiving a jacking device in the last mentioned ends.

9. In a motor vehicle having a chassis frame and springs, spring shackles connecting the spring to the chassis, an extension on the shackle nearest the end of the vehicle and adapted to receive a jack to cause the vehicle to be raised.

10. In a motor vehicle having a chassis frame and springs, spring shackles connecting the spring to the chassis, an extension on the shackle nearest the end of the vehicle and means carried thereby to engage a jack for raising the vehicle.

SWINFEN BRAMLEY-MOORE.